(12) United States Patent
Ahopelto et al.

(10) Patent No.: US 8,296,282 B2
(45) Date of Patent: Oct. 23, 2012

(54) CREATION OF A VIRTUAL COMMUNITY

(75) Inventors: Timo Ahopelto, Helsinki (FI); Donald Peppers, Sea Island, GA (US); Kai Friman, Espoo (FI)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/093,162

(22) Filed: Apr. 25, 2011

(65) Prior Publication Data

US 2011/0202566 A1 Aug. 18, 2011

Related U.S. Application Data

(63) Continuation of application No. 11/888,680, filed on Aug. 2, 2007, now Pat. No. 7,974,941, which is a continuation of application No. PCT/FI2006/050356, filed on Aug. 14, 2006.

(51) Int. Cl.
*G06F 17/30* (2006.01)
(52) U.S. Cl. ...................................... 707/706
(58) Field of Classification Search .................. 707/609, 707/922, 999.107; 455/407, 418, 420
See application file for complete search history.

(56) References Cited

U.S. PATENT DOCUMENTS

| | | | |
|---|---|---|---|
| 6,408,309 B1 | 6/2002 | Agarwal | |
| 2002/0006803 A1* | 1/2002 | Mendiola et al. | 455/466 |
| 2002/0019829 A1 | 2/2002 | Shapiro | |
| 2002/0075305 A1 | 6/2002 | Beaton et al. | |
| 2003/0126015 A1 | 7/2003 | Chan et al. | |
| 2004/0209649 A1 | 10/2004 | Lord | |
| 2005/0228680 A1 | 10/2005 | Malik | |
| 2005/0239504 A1 | 10/2005 | Ishii et al. | |
| 2005/0273465 A1 | 12/2005 | Kimura | |
| 2006/0040642 A1 | 2/2006 | Boris et al. | |
| 2006/0048059 A1 | 3/2006 | Etkin | |
| 2006/0068845 A1 | 3/2006 | Muller et al. | |
| 2006/0117378 A1 | 6/2006 | Tam et al. | |
| 2007/0037562 A1 | 2/2007 | Smith-Kerker et al. | |

FOREIGN PATENT DOCUMENTS

| | | |
|---|---|---|
| BE | 1015704 | 7/2005 |
| EP | 1 528 827 A2 | 5/2005 |
| EP | 1 772 822 A1 | 4/2007 |
| WO | WO 2004/100470 A1 | 11/2004 |
| WO | WO 2005/073863 A1 | 8/2005 |

(Continued)

OTHER PUBLICATIONS

Communication (Notice of Allowance) issued Apr. 29, 2011 in related U.S. Appl. No. 11/888,680 (13 pages).

(Continued)

*Primary Examiner* — Thu-Nguyet Le
(74) *Attorney, Agent, or Firm* — Novak Druce + Quigg LLP

(57) ABSTRACT

In order to facilitate creation of a community without member-specific registration, one or more sibling identifiers with corresponding units to be distributed to other persons are allocated to a subscriber and the one or more sibling identifiers is associated with the subscriber's identifier. The subscriber may then give a unit to his/her friend and when the friend uses the unit, or more precisely a sibling identifier the unit relates to, the system will recognize that the subscriber and the friend belong to the same community on the basis of the association formed when sibling identifiers were allocated.

27 Claims, 5 Drawing Sheets

FOREIGN PATENT DOCUMENTS

| | | |
|---|---|---|
| WO | WO 2006/024003 A1 | 3/2006 |
| WO | WO 2007/002025 A2 | 1/2007 |
| WO | WO 2007/060451 A1 | 5/2007 |
| WO | WO 2007/091089 A1 | 8/2007 |

OTHER PUBLICATIONS

Milton Mueller, Telecommunication Access in Age of Electronic Commerce: Toward a Third-Generation Service Policy, Nov. 1996, 49 Fed. Comm L.J. 655-665.

* cited by examiner

MIM TABLE

| MIM ID | AVAILABILITY | STATUS |
|---|---|---|
| MIM1 | Delivered | Active |
| MIM2 | Delivered | Active |
| MIM3 | Delivered | Passive |
| ⋮ | ⋮ | ⋮ |
| MIMn | Undelivered | Passive |

SIBLING TABLE

| NAME | PREFERENCES | PRIMARY | SIBLINGS |
|---|---|---|---|
| A.N. | xyz<br>xyz | MIM1<br>MIM2 | MIM2, MIM3 |

SUBSCRIBER INFORMATION TABLE

| MIM ID | NAME | ADDRESS | PREFERENCES | CREDIT |
|---|---|---|---|---|
| MIM1 | A.N. | HOME | xyz | 50 |

*FIG.3*

CREATION OF A VIRTUAL COMMUNITY

CROSS-REFERENCE TO RELATED APPLICATION

This application is a Continuation of U.S. patent application Ser. No. 11/888,680 filed Aug. 2, 2007, which is a Continuation of International Application PCT/FI2006/050356, filed Aug. 14, 2006, the entire disclosure of each of which is incorporated herein by reference.

FIELD OF THE INVENTION

The present invention relates to creation of a virtual community in a communication system.

BACKGROUND INFORMATION

Due to the extension of the Internet and evolvement of communication technology, people are more and more often sharing information within virtual communities using services provided by and/or via the Internet. A virtual community is a place where the members of the community exchange messages with each other, said messages being text messages, voice messages, video messages, different types of multimedia messages, etc. Some examples of a virtual community (hereinafter called a community) include "buddy list" type of lists of friends in instant messaging, address books in email applications or chat room membership lists. There are several ways to form a community when the Internet, or any other software based mechanism requiring user registration, is used. However, there is no mechanism to form a community without each member's specific registration to join the community, and using identifiers relating to units identifiable by a communication system.

SUMMARY OF THE INVENTION

An object of the present invention is thus to provide a method and an apparatus for implementing the method so as to provide a mechanism to form a community using units identifiable by a communication system. The object of the invention is achieved by a method, a computer program product, a server component and a system which are characterized by what is stated in the independent claims. The preferred embodiments of the invention are disclosed in the dependent claims.

The invention is based on the realization of the problem and solving it by allocating a subscriber one or more sibling identifiers with corresponding units to be distributed to other persons and associating the one or more sibling identifiers with the subscriber's identifier. The subscriber may then give a unit to his/her friend and when the friend uses the unit, or more precisely a sibling identifier the unit relates to, the system will recognize that the subscriber and the friend belong to the same community on the basis of the association formed when sibling identifiers were allocated.

An advantage of the invention is that a community is formed without any specific registration of each community member: it suffices that sibling identifiers are requested, the user of a unit relating to the sibling identifier needs not perform any specific action to join the community.

BRIEF DESCRIPTION OF THE DRAWINGS

In the following the invention will be described in greater detail by means of embodiments with reference to the attached drawings, in which

FIG. 3 illustrates exemplary data structures;

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment.

The present invention is applicable to any user terminal, server and/or to any communication system or any combination of different communication systems that can identify users and/or terminals by identifiers on units, or allocated for the units or on the basis of information on the units, and can be embodied in a computer program embodied in a non-transitory computer readable medium, a server component or server. As used in this application, computer program, non-transitory computer readable medium, server component and server are intended to have their normal definition as known in the art. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to the invention. Therefore, all words and expressions should be interpreted broadly and they are intended to illustrate, not to restrict, the invention.

In the following, different embodiments of the invention will be described using mobile phone technology as an example without restricting the invention thereto.

Figure 1:
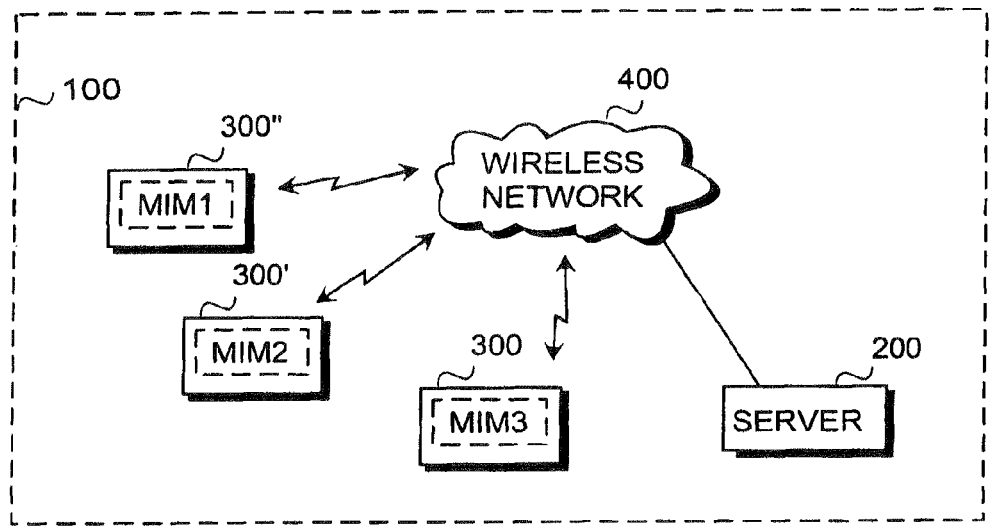
FIG. 1 illustrates an example of a general architecture of a communication system.

A general architecture of a communication system being capable of providing a social networking service is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions, interfaces, and structures. It should be appreciated that the functions, interfaces, structures, elements and the protocols used in or for mobile phone communication, or any other corresponding communication, are irrelevant to the actual invention. Therefore, they need not be discussed in more detail here.

The communication system 100 in FIG. 1 comprises user terminals 300, 300', 300" connectable via a wireless network 400 to a server 200 providing a social networking service. A social network service is focused on the building and verifying of social networks, i.e. communities, for whatever purpose. Examples of a social networking service include one or more of the following: creation of a virtual community, maintenance of the virtual community, information delivery within the virtual community, and enabling services and service delivery to the virtual community.

A user terminal 300, 300', 300" is a piece of equipment or a device that comprises, or is arranged to comprise, a unit MIM1, MIM2, MIM3 (member identifying module) with an identifier and allows a user to interact with a communications system directly or via a computer system and/or via a non-data-processing device, for example. The user terminal presents information to the user and allows the user to input information. In other words, the user terminal 300, 300', 300" may be any node or a host which is able to communicate with a network 400 of the system, over an access network (not shown in FIG. 1) if such an access network exists. The user terminal 300, 300', 300" may be any terminal capable of being provided with an identifier allocated by a service provider and capable of receiving information from and/or transmitting information to the network, such as a personal computer, a game console, a laptop (a notebook), a personal digital assistant, a mobile station (mobile phone), a line telephone, connected to the network 400 wirelessly or via a fixed connection. The unit MIM1, MIM2, MIM3 with an identifier may be embedded or downloaded software and/or hardware. Examples of the unit MIM1, MIM2, MIM3 include a card, such as a smart card, or corresponding module, comprising the identifier, and a user terminal with an integrally embedded identifier. Examples of different identifiers include subscriber identities allocated by operators, such as IMSI (international mobile subscriber identity), which is a unique number associated with a subscriber, IMEI (international mobile station equipment identity), a telephone number, a personal unblocking code, a smart card serial number and a smart card identity number. The identifier may be in any format and have any name and may be any piece of information or code that may take any suitable desired form, such as numeric, alphanumeric, ASCII, graphic, iconic or other machine-readable codes, or combinations of the foregoing. The identifier is preferably either sent by the user terminal to the network when the user terminal registers to the network or deduced by the system on the basis of an identifier sent by the user terminal to the network when the user terminal registers to the network. In embodiments where a card is used as the unit with an identifier, the card may be detachably connectable to the user terminal, either as a contact card or a contactless card.

The server 200 represents one or more servers, or server components, or apparatuses, providing social networking services and/or communications services. In addition, the server 200 may utilize community information for different purposes, such as for marketing. The server 200 is illustrated in detail below with FIGS. 2 to 7.

In the following, different embodiments illustrating server operations are described using MIM as an example of an identifier without restricting the invention thereto. It should also be appreciated that the server operations may be implemented in one or more physical or logical entities.

Figure 2:
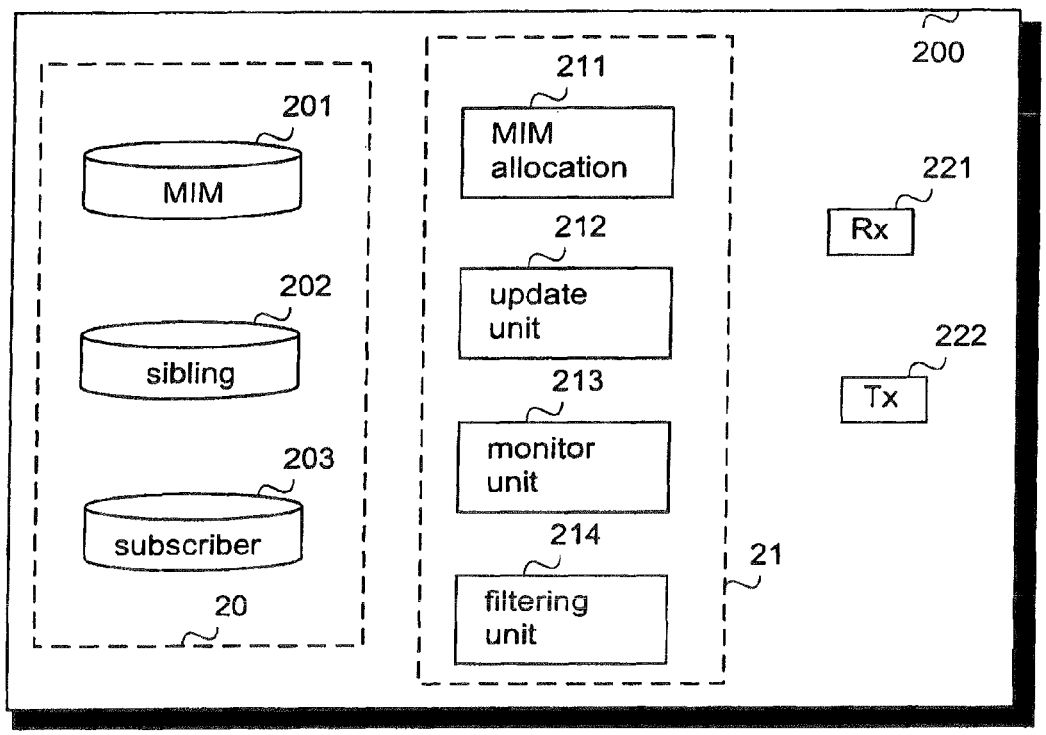
FIG. 2 is a block diagram of a server according to an embodiment.

FIG. 2 is a block diagram of a server, or a corresponding server component, according to an embodiment of the invention. Although the server has been depicted as one entity, different modules and databases/memory may be implemented in one or more physical or logical entities. The server 200 is configured to manage data on communities created by a service provider's subscribers or their siblings with the help of the service provider, as will be described below. For this purpose, the server comprises data storage 20 with a MIM database 201 for storing information on the service provider's MIMs, a sibling database 202 for storing information on created communities, a subscriber database 203 for storing subscriber information, a service provider unit 21 for providing community services, a receiving unit 221 for receiving different inputs, information and messages, and a sending unit 222 for sending different outputs, information and messages.

The service provider unit 21 comprises a MIM allocation unit 211 for managing MIMs the service provider has received and for allocating MIMs, an update unit 212 for updating data in the databases, a monitor unit 213 for monitoring whether or not one or more certain actions, such as updating data, take place and for performing functions relating to the actions, and a filter unit 214 for filtering information from the databases. The functionality of the MIM allocation unit 211 is described in more detail below with Figures, especially with FIG. 4. The functionality of the update unit 212 and the functionality of the monitor unit 213 are described in more detail below with Figures, especially with FIG. 5. The filtering unit 214 may be configured to filter different information from the database(s), such as creators of communities (creators being MIMs that are no one's siblings), members of communities with certain preferences or user profiles, linkages between communities, users having communities that are among 10 (or any number) strongest or widest communities, etc. In other words, the filtering unit enables different database searches, an example of which is illustrated with FIG. 7.

It should be appreciated that the service provider unit may comprise other units used in or for the social networking service and/or communication service, such as a unit providing information exchange within a community. However, they are irrelevant to the actual invention and, therefore, they need not to be discussed in more detail here.

The server may be configured as a computer including at least a memory providing storage area used for arithmetic operation and an operation processor for executing the arithmetic operation. The service provider unit 21 may be configured as a program executed by the operation processor, for example a central processing unit. The databases mentioned above may be located in the memory and data in the databases is explained in more detail below with FIG. 3.

In other words, the servers or corresponding server components and/or other corresponding devices implementing the functionality of an embodiment comprise not only prior art means, such as sending means and receiving means, but also means for implementing one or more functions described here with an embodiment. Present servers comprise processors and memory that can be utilized in the functions according to an embodiment of the invention. All modifications and configurations required for implementing an embodiment of the invention may be performed as routines, which may be implemented as added or updated software routines, application circuits (ASIC) and/or programmable circuits. Software routines, also called program products, including applets and macros, can be stored in any server-readable data storage medium and they include program instructions to perform particular tasks. Software routines may be downloaded into a server.

FIG. 3 illustrates examples of data structures 3 according to an embodiment of the invention, the data structures 3 being maintained and/or accessible by one or more servers and stored in one or more databases. For example, a MIM table 301 may be stored in the MIM database illustrated in FIG. 2, a sibling table 302 may be stored in the sibling database illustrated in FIG. 2, and, correspondingly, a subscriber information table may be stored in the subscriber database illustrated in FIG. 2. Furthermore, it is possible to organize the data structures differently, combine them or parts of them, and/or store some data elsewhere. For example, parts of the data in the subscriber information table may be stored in a home subscriber database, such as a home location register. Here the row below column titles illustrates an entry.

The MIM table 301 contains MIM identifiers 31 stored in the system, thereby indicating that the corresponding units are ready to be allocated and delivered. In other words, the service provider preferably stores the MIM identifiers the service provider has, prior to allocating them and prior to delivering corresponding units. However, MIM identifiers may be stored when allocated and/or during the delivery. The MIM table 301 associates a MIM identifier 31 with availability information 32 on the MIM identifier in question and with status information 33 on the MIM identifier in question. The availability information 32 indicates whether or not the MIM is free to be allocated: undelivered means free, and delivered means not free but allocated to be used in the example of FIG. 3. The status information 33 indicates whether or not the unit comprising the MIM has been used: active means that it has been used, passive means that it has not been used in the example of FIG. 3. The status information 33 may be used for other purposes, too.

The sibling table 302 associates different MIMs to a community by associating a primary identifier 36 in an entry with zero or more sibling identifiers 37. In the embodiment illustrated in FIG. 3, the sibling table further comprises additional information relating to the owner, or subscriber, of the primary identifier (and the corresponding unit), thereby adding some extra information on the community. In the example of FIG. 3, the additional information comprises the user's name 34 and preferences 35. A service provider providing the social networking service may define what information the additional information comprises, and it may be anything the service provider considers as useful information, naturally within the local laws. Other examples of the additional information include hobbies and user profiles. The service provider may also define that no additional information is stored in the sibling table.

As can be seen, in the embodiment of FIG. 3, an active sibling MIM2, has also been added to be a primary identifier without any siblings and with some additional information copied from the primary identifier's additional information (i.e. preferences of MIM1 are copied to be preferences of MIM2).

The subscriber information table 303 associates the primary identifier 36' with subscriber information, such as name 34', address 38, preferences 35' and credit 39. In this example, the subscriber information table 303 contains information received from the user (subscriber) and no copied information and some of the information overlaps with the sibling table. In some other embodiments, the subscriber information table and the sibling table may be merged together, or they may be separate tables without overlapping information, except the MIM identity, or any other reliable key with which information may be searched.

It should be appreciated that data structures according to other embodiments of the invention may comprise only some of the data described above, and/or further data not described above. It suffices that primary and sibling MIMs are associated with each other.

From the data structures of FIG. 3, the following information may be deduced: The service provider has n MIM identifiers, and corresponding units; MIM1, MIM2 and MIM3 with corresponding units are delivered to the user A.N. who has updated, or otherwise filled his/her subscriber information, MIM2 and MIM3 being siblings of MIM1; MIM2 has been taken into use without filling or updating the subscriber information and therefore preferences relating to MIM1 are used in the sibling table; and that MIM3 has not yet been taken into use.

Figure 4:
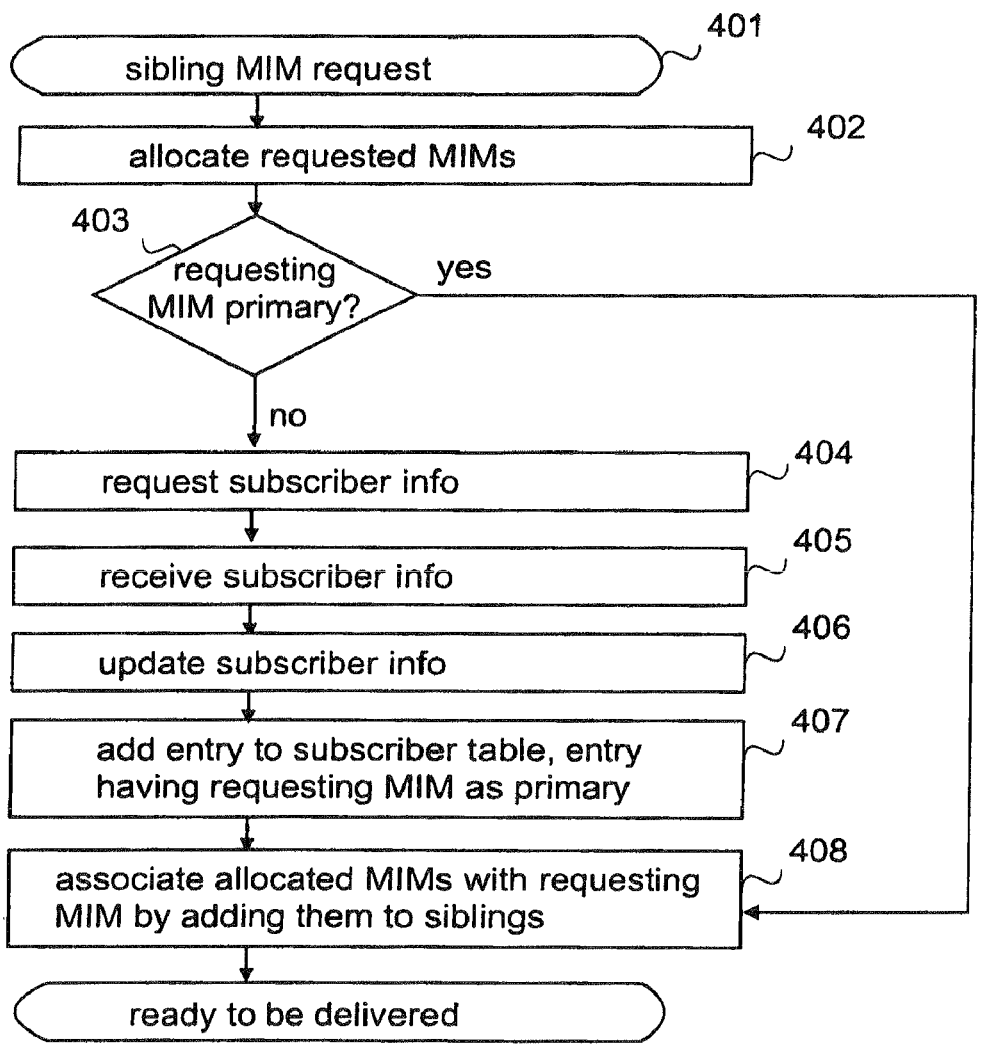
FIG. 4 is a flow chart illustrating creation of a community in one embodiment of the invention.

FIG. 4 is a flow chart illustrating creation of sibling MIMs according to an embodiment. In the embodiment, it is assumed that in response to filling subscriber information, MIM will become a primary with no siblings and that sibling MIMs can be used, at least for some time, without filling the subscriber information. A further assumption made here, for the sake of clarity, is that the MIM requesting siblings, i.e. a requesting MIM, is a delivered one. In other words, it is assumed that the requesting MIM is a valid MIM.

Referring to FIG. 4, a request for sibling MIMs is received or otherwise detected in step 401. The request may be an implicit request triggered by a predefined event which depends on implementation and service provider definitions, policies, rules, etc., or the request may be an explicit event received from the user of the primary MIM. Examples of events triggering the request include a primary MIM registering to the service, i.e. giving the service provider required subscriber information, as the primary MIM having used the service so that he/she will be charged a certain amount of money, all previous siblings of the primary MIM having been activated, etc. However, it bears no significance to the invention how and why a sibling request is detected/received.

In response to the request, requested MIMs are allocated in step 402. The number of MIMs to be allocated may be indicated in the request, it may depend on the event that triggered the request, and/or it may always be a predefined number, for example two siblings per request. The process then continues depending on whether or not the requesting MIM is a primary MIM.

If the requesting MIM is not a primary MIM (step 403), subscriber information on the requesting MIM is requested in step 404, and received in step 405, after which the subscriber information is updated in step 406, and an entry having the requesting MIM as the primary MIM is added to a sibling table in step 407. Then the allocated MIMs are associated with the requesting MIM by adding them to the siblings of the requesting MIM to the sibling table in step 408. Then the units are ready to be delivered to the user of the requesting MIM so that he/she can give them to his/her friends, for example. However, the way the units with identifiers are delivered and/or distributed to the user(s) bears no significance to the invention and therefore it is not described in detail here.

If the requesting MIM is a primary MIM (step 403), the process proceeds directly to step 408 where siblings are added to the sibling table.

As can be seen from the above, the sibling table of the above embodiment forms a tree structure which defines a wider community comprising several entries linked to each other. It also facilitates adding levels usable as filtering criteria, for example, to a community.

In another embodiment of the invention, if the requesting MIM is a primary MIM, he/she will be given an opportunity to decide whether to add the siblings to the existing entry or whether another entry should be added, the other entry comprising the requesting MIM as a primary MIM, and the allocated ones as siblings. For this new entry, the requesting MIM may give other additional information than what exists in the older entry/entries, thus enabling establishment of different communities.

Figure 5:
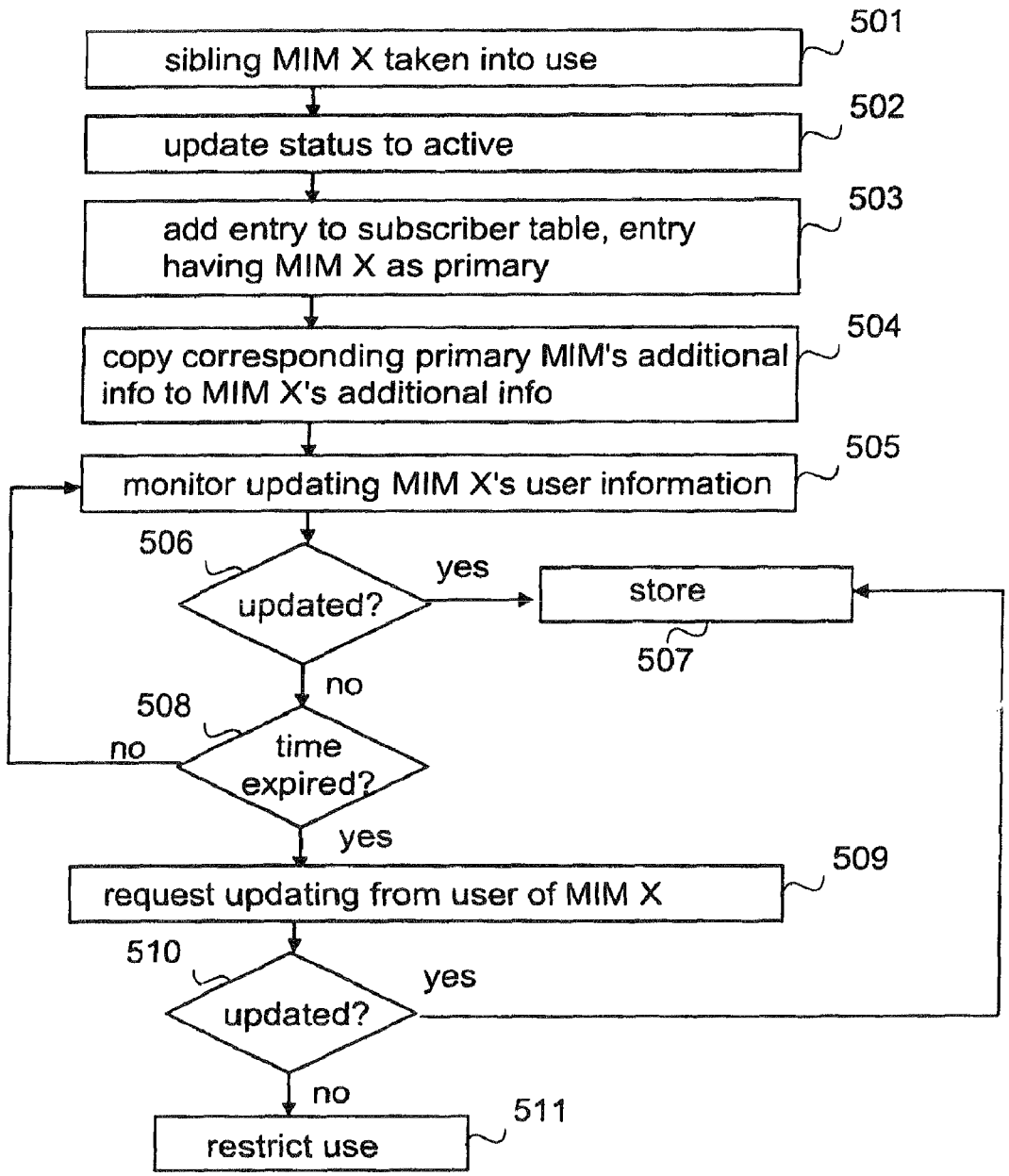
FIGS. 5, 6 and 7 are flow charts illustrating embodiments of the invention.

FIG. 5 illustrates a flow chart of an embodiment of the invention in a situation in which a sibling unit, and thereby a sibling identifier, is taken into use by the one who received it. The user of the unit has, for example, switched on a mobile phone comprising the identifier itself or a mobile identifier module comprising the identifier, and therefore the mobile phone registers to a network and, during registration, sends the identifier, or information on the basis of which the identifier is received. A further assumption made here is that a server, or a server system, according to the embodiment corresponds to a home location server or home location register from which the system enquires subscriber information when a user terminal attaches to the system.

Referring to FIG. 5, it is noticed, in step 501, that a sibling MIM X has been taken into use, and therefore MIM X's status is updated to active in step 502, an entry is added in step 503 to a sibling table, said entry having MIM X as a primary MIM. Then predetermined parts of the additional information on the primary MIM whose sibling MIM X is copied in step 504 to the entry to be the additional information on MIM X. For example, if the sibling table is the one illustrated in FIG. 3, a service provider may have determined that the preferences are copied but the name is not copied. Then it is monitored in step 505 whether or not the user of MIM X registers to the social networking service, i.e. whether or not he/she updates subscriber information, such as name and address, or recharges money to a prepaid account, within a predefined rule. The service provider may define what subscriber information needs to be updated and within which time limit it needs to be updated. The service provider may also define the point from which the time starts to run, examples of such points including the activation of the MIM X, the allocation of the MIM X, and the actual delivery date of the corresponding unit. The monitoring (step 505) is continued until the information is updated (506) or the time described above expires (step 508), whichever happens first. If the information is updated (step 506), the updated information is stored in step 507. If the time expires (508) without the subscriber information being updated, the user of MIM X is requested in step 509 to update the information. If the information is updated (step 510), the updated information is stored in step 507. If the information is not updated (step 510), the use of MIM X is restricted in step 511. The status of the MIM may also be changed to restricted and/or the entry added in step 503 with corresponding additional information may be deleted or otherwise emptied. The use may be restricted so that a user terminal with MIM X can only be used for registering to the service in addition to emergency calls.

As can be seen from the above, no specific action is requested by the user of the user terminal with MIM X to become a member of a community. By copying the primary's references, some information for advertisement purposes, for example, will be stored, and probably no serious mistakes will occur, since typically friends share similar interests.

In one embodiment of the invention, no monitoring is performed. In embodiments comprising monitoring, the service provider may determine what happens if the subscriber information is not updated within a certain time limit and/or after the enquiry. The use may also be restricted step by step depending on time or on the amount of the use and/or for what it is used (sending messages, receiving calls/messages, for example). Further, instead of or in addition to monitoring subscriber information update, the service provider may define something else to be monitored and a predefined rule, and/or a set of rules, within which updating or "the something else" has to be performed.

Figure 6:
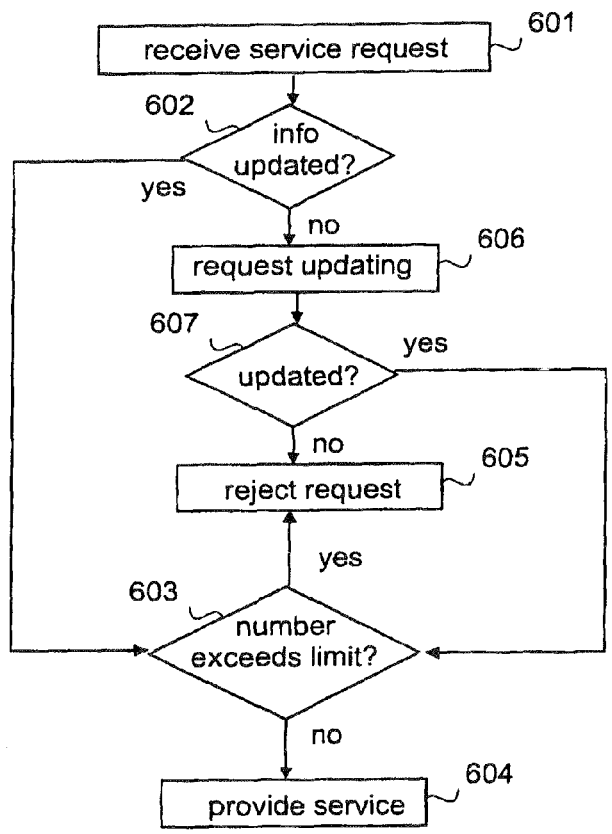

FIG. 6 illustrates a flow chart of an embodiment of the invention in which the subscriber's ability to order services is controlled. The embodiment may be implemented by a monitoring unit, for example. In the example of FIG. 6, it is assumed, for the sake of clarity, that the number of siblings MIMs is limited to a certain predefined number, and that information on the number of allocated siblings is maintained in subscriber information. It should be appreciated that the service provider may define any rules or definitions for any service it provides. Another example of such a rule/definition is that if a certain number of sibling MIMs, although taken into use, have no updated subscriber information, no further sibling MIMs are allocated.

Referring to FIG. 6, a service request is received in step 601, said service request being an order of a certain number of sibling MIMs from the user of MIM Y. Firstly, it is checked in step 602 whether or not the user of MIM Y has registered to the social networking service, i.e. whether or not he/she has updated subscriber information. If the subscriber information is updated (step 602), it is checked in step 603 whether or not the number of sibling MIMs, when the ordered number of sibling MIMs are added to the information on the number maintained in the subscriber information on MIM Y, exceeds a predefined limit. If it does not, the service is provided in step 604, for example as illustrated above with FIG. 4, including updating the number maintained in the subscriber information. If the number exceeds a predefined limit (step 603), the service request is rejected in step 605. In other embodiments, some other actions may be performed instead, or in addition to step 605.

If the subscriber information has not been updated (step 602), the user is requested in step 606 to update the subscriber information. If the subscriber information is updated (step 607), the process continues to step 603 in which the number of sibling MIMs is compared with a predefined limit. If the subscriber information is not updated (step 607), the process continues to step 605, in which the request is rejected.

Figure 7:
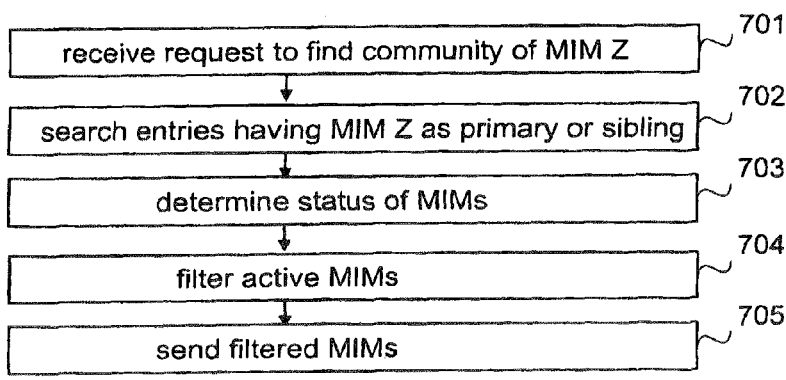

FIG. 7 illustrates a flow chart according to an embodiment of the invention, in which members belonging to a community of a certain subscriber are searched. In the example, it is assumed that data structures illustrated in FIG. 3 are used in the search.

Referring to FIG. 7, when a request to find a community of MIM Z, i.e. members belonging to the same community with MIM Z, is received in step 701, entries having MIM Z either as a primary MIM or as one of the siblings are searched in step 702 from the sibling database. Then the status of MIMs in each found entry is determined MIM-specifically in step 703 from the MIM table and those MIMs whose status is active are filtered in step 704 and the filtered MIMs, preferably including MIM Z, are sent in step 705 in a response to the request as the members belonging to community.

The steps and related functions described above in FIGS. 4, 5, 6 and 7 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

Information on established communities may be used when users communicate within their community, or for different information delivery purposes, or for social service activation purposes. For example, a service provider and/or a member can use the information to provide specific mobile services, such as group communication, to a community, or advertises may use the information to select to whom marketing messages will be sent, i.e. to target the marketing messages. Targeting may be finding communities having certain preferences, finding out subscribers who are central in their social networks, sending one marketing message to each community or sending n messages to cover x % of each community, for example. With this targeting, e.g. sending one message to a central subscriber in a community instead of sending a message to each member of the community, marketing costs as well as network load may be reduced without substantially reducing the effectiveness of marketing.

A service provider may save costs because in some embodiments there is no need to maintain a separate register on relationships between subscribers, there is no need to request information on the relationships from the user, and there is no need to have specific campaigns, for example by offering cheaper short messages within friends specified by a subscriber, for finding out the communities.

It will be obvious to a person skilled in the art that, as the technology advances, the inventive concept can be implemented in various ways. The invention and its embodiments are not limited to the examples described above but may vary within the scope of the claims.

The invention claimed is:

1. A method for creating a virtual community comprising:
   allocating for a first subscriber a first unit having an identifier and a second unit having an identifier, the second unit to be distributed to a user;
   associating the identifier of the first unit as a primary identifier and the identifier of the second unit as a sibling identifier, prior to use of the second unit, to create an associated community, wherein the associated community is based on a relationship between the identifiers;
   recognizing, in response to an initial use of the second unit with the sibling identifier, the community to which the user of the second unit with the sibling identifier belongs on the basis of the association; and
   substituting known preferences of the first subscriber for any unknown preferences of the user of the second unit, wherein the preferences are unrelated to subscription of the first subscriber.

2. The method of claim 1, further comprising:
   copying, in response to the initial use of the second unit having the sibling identifier, additional information relating to the first subscriber to a database.

3. The method of claim 1, further comprising:
   maintaining status information regarding sibling identifiers; and
   updating, in response to a first use of the second unit having the sibling identifier, status information of the sibling identifier to indicate that the sibling identifier has been used.

4. The method of claim 3, further comprising determining community members on the basis of the status information of the sibling identifier and associations between the first unit and the second unit.

5. The method of claim 3, further comprising:
   monitoring whether updating of the status information of the sibling identifier occurs within a predefined rule; and
   restricting use of the second unit in response to the status information of the sibling identifier not being updated within the predefined rule.

6. The method of claim 1, further comprising:
   receiving a request for service from the first subscriber;
   checking whether a predefined rule relating to the service is fulfilled;
   providing the service if the predefined rule relating to the service is fulfilled; and
   rejecting the request if the predefined rule relating to the service is not fulfilled.

7. The method of claim 1, further comprising:
   receiving a request for service from the user;
   checking whether a predefined rule relating to the service is fulfilled;
   providing the service if the predefined rule relating to the service is fulfilled; and
   rejecting the request if the predefined rule relating to the service is not fulfilled.

8. A computer program product embodied in a non-transitory computer-readable medium and comprising program instructions, wherein execution of said program instructions causes a computer containing the computer program product to perform the steps of:
   allocating a subscriber one or more sibling identifiers with corresponding units to be distributed to other persons;
   associating the one or more sibling identifiers with the subscriber's identifier, prior to use of the sibling identifier, to create an associated community, wherein the associated community is based on a relationship between the identifiers;
   recognizing, in response to a use of a unit with a sibling identifier, a community to which a user of the unit with the sibling identifier belongs on the basis of the association; and
   substituting known preferences of the first subscriber for any unknown preferences of the user of the second unit, wherein the preferences are unrelated to subscription of the first subscriber.

9. The computer program product of claim 8 wherein execution of said program instructions causes a computer containing the computer program product to perform the further steps of:
   maintaining status information on sibling identifiers; and
   updating, in response to a first use of the unit with the sibling identifier, the status to indicate that the sibling identifier has been taken into use.

10. The computer program product of claim 8 wherein execution of said program instructions causes a computer containing the computer program product to perform the further step of determining community members on the basis of the status information and associations.

11. The computer program product of claim 8 wherein execution of said program instructions causes a computer containing the computer program product to perform the further steps of:
    monitoring whether or not updating of subscriber information on the user is performed within a predefined rule; and
    restricting the use of the unit in response to the subscriber information on the user not being updated within the predefined rule.

12. The computer program product of claim 8 wherein execution of said program instructions causes a computer containing the computer program product to perform the further steps of:
    receiving a service request from the subscriber;
    checking whether a predefined rule relating to the service is fulfilled;
    providing the service if the predefined rule relating to the service is fulfilled; and
    rejecting the request if the predefined rule is not fulfilled.

13. The computer program product of claim 8 wherein execution of said program instructions causes a computer containing the computer program product to perform the further steps of:
    receiving a service request from the user;
    checking whether a predefined rule relating to the service is fulfilled;
    providing the service if the predefined rule relating to the service is fulfilled; and rejecting the request if the predefined rule is not fulfilled.

14. A system comprising:
a processor configured to:
allocate for a first subscriber a first unit having an identifier and a second unit having an identifier, the second unit to be distributed to a user;
associate the identifier of the first unit as a primary identifier and the identifier of the second unit as a sibling identifier, prior to use of the second unit, to create an associated community, wherein the associated community is based on a relationship between the identifiers;
recognize, in response to an initial use of the second unit with the sibling identifier, the community to which the user of the second unit with the sibling identifier belongs on the basis of the association; and
substitute known preferences of the first subscriber for any unknown preferences of the user of the second unit, wherein the preferences are unrelated to subscription of the first subscriber.

15. The system of claim 14, wherein the processor is further configured to:
copy, in response to the initial use of the second unit having the sibling identifier, additional information relating to the first subscriber to a database.

16. The system of claim 14, wherein the processor is further configured to:
maintain status information regarding sibling identifiers; and
update, in response to a first use of the second unit having the sibling identifier, status information of the sibling identifier to indicate that the sibling identifier has been used.

17. The system of claim 16, wherein the processor is further configured to:
determine community members on the basis of the status information of the sibling identifier and associations between the first unit and the second unit.

18. The system of claim 16, wherein the processor is further configured to:
monitor whether updating of the status information of the sibling identifier occurs within a predefined rule; and
restrict use of the second unit in response to the status information of the sibling identifier not being updated within the predefined rule.

19. The system of claim 14, wherein the processor is further configured to:
receive a request for service from the first subscriber;
check whether a predefined rule relating to the service is fulfilled;
provide the service if the predefined rule relating to the service is fulfilled; and
reject the request if the predefined rule relating to the service is not fulfilled.

20. The system of claim 14, wherein the processor is further configured to:
receive a request for service from the user;
check whether a predefined rule relating to the service is fulfilled;
provide the service if the predefined rule relating to the service is fulfilled; and
reject the request if the predefined rule relating to the service is not fulfilled.

21. A server for creating a virtual community, the server comprising:
a processor configured to:
allocate for a first subscriber a first unit having an identifier and a second unit having an identifier, the second unit to be distributed to a user;
associate the identifier of the first unit as a primary identifier and the identifier of the second unit as a sibling identifier, prior to use of the second unit, to create an associated community, wherein the associated community is based on a relationship between the identifiers;
recognize, in response to an initial use of the second unit with the sibling identifier, the community to which the user of the second unit with the sibling identifier belongs on the basis of the association; and
substitute known preferences of the first subscriber for any unknown preferences of the user of the second unit, wherein the preferences are unrelated to subscription of the first subscriber.

22. The server of claim 21, wherein the processor is further configured to:
copy, in response to the initial use of the second unit having the sibling identifier, additional information relating to the first subscriber to a database.

23. The server of claim 21, wherein the processor is further configured to:
maintain status information regarding sibling identifiers; and
update, in response to a first use of the second unit having the sibling identifier, status information of the sibling identifier to indicate that the sibling identifier has been used.

24. The server of claim 23, wherein the processor is further configured to:
determine community members on the basis of the status information of the sibling identifier and associations between the first unit and the second unit.

25. The server of claim 23, wherein the processor is further configured to:
monitor whether updating of the status information of the sibling identifier occurs within a predefined rule; and
restrict use of the second unit in response to the status information of the sibling identifier not being updated within the predefined rule.

26. The server of claim 21, wherein the processor is further configured to:
receive a request for service from the first subscriber;
check whether a predefined rule relating to the service is fulfilled;
provide the service if the predefined rule relating to the service is fulfilled; and
reject the request if the predefined rule relating to the service is not fulfilled.

27. The server of claim 21, wherein the processor is further configured to:
receive a request for service from the user;
check whether a predefined rule relating to the service is fulfilled;
provide the service if the predefined rule relating to the service is fulfilled; and
reject the request if the predefined rule relating to the service is not fulfilled.

* * * * *